United States Patent [19]

Ogawa et al.

[11] Patent Number: 5,355,523
[45] Date of Patent: Oct. 11, 1994

[54] WIRELESS TRANSMISSION/RECEPTION SYSTEM INCLUDING TRANSMITTING TERMINAL PRODUCING MULTIPLE FREQUENCY LOCAL OSCILLATION SIGNALS AND RECEIVING TERMINAL STORING A LOCAL OSCILLATION SIGNAL

[75] Inventors: Haruo Ogawa; Haruhiro Kuboyama; Hirofumi Konishi; Toshiaki Inage; Shinji Morino; Yoshiaki Ueno; Haruhiko Hyosu; Yoshihiro Shogaki, all of Kadoma, Japan

[73] Assignee: Matsushita Electric Works, Ltd., Osaka, Japan

[21] Appl. No.: 920,874

[22] Filed: Jul. 28, 1992

[30] Foreign Application Priority Data

| Aug. 9, 1991 | [JP] | Japan | 3-200361 |
| Sep. 2, 1991 | [JP] | Japan | 3-221879 |
| Sep. 2, 1991 | [JP] | Japan | 3-221880 |
| Jan. 27, 1992 | [JP] | Japan | 4-012060 |

[51] Int. Cl.$^5$ .............................. H04B 1/40
[52] U.S. Cl. ........................ 455/71; 455/46; 455/75; 455/88; 455/259
[58] Field of Search .............. 455/19, 20, 23, 46, 455/51.1, 68-72, 88, 201-203, 259, 313, 75, 76, 102, 86, 87

[56] References Cited

U.S. PATENT DOCUMENTS

| 2,227,902 | 1/1941 | Hähnle | 455/201 |
| 3,147,437 | 9/1964 | Crafts et al. | 455/202 |
| 3,182,259 | 5/1965 | Holder | 455/203 |
| 3,973,203 | 8/1976 | Kahn | 455/202 |

*Primary Examiner*—Edward F. Urban
*Assistant Examiner*—Chi Pham
*Attorney, Agent, or Firm*—Leydig, Voit & Mayer

[57] ABSTRACT

A wireless transmission system includes a plurality of terminal units, a specific one of which is provided with a transmission/receiving circuit that transmits a reference signal of a local oscillation frequency, while all others of which are provided respectively with a transmission/receiving circuit that prepares, on the basis of the reference signal received, a local oscillation frequency signal for frequency conversion of transmitting/receiving frequency signal and intermediate frequency signal, to thereby realize the system at lower costs even when a high local oscillation frequency is employed.

2 Claims, 9 Drawing Sheets

WIRELESS TRANSMISSION/RECEPTION SYSTEM INCLUDING TRANSMITTING TERMINAL PRODUCING MULTIPLE FREQUENCY LOCAL OSCILLATION SIGNALS AND RECEIVING TERMINAL STORING A LOCAL OSCILLATION SIGNAL

BACKGROUND OF THE INVENTION

This invention relates to a wireless transmission system for transmitting and receiving signals between a plurality of terminal units in wireless manner.

The wireless transmission system of the kind referred to should find its utility when used in transmitting data signals, voice signals and so on between the respective terminal units.

DESCRIPTION OF RELATED ART

Generally, in the wireless transmission system, a transmission circuit is so arranged that an intermediate frequency signal is received as an input at a frequency converting circuit and mixed with a local oscillation frequency signal from a local oscillator, and a conversion into a radio frequency transmitting/receiving signal is performed, and a signal of a required frequency is amplified at an amplification circuit and transmitted through an output circuit and an antenna. While a receiving circuit is so arranged that, among signals received through an antenna and an input circuit, the signal of the required frequency is amplified at an amplification circuit, mixed with a local oscillation signal from a local oscillator, and converted at a frequency converting circuit into an intermediate frequency signal to be provided as an output.

Basic technologies of the wireless transmission system of this kind have been disclosed in, for example, U.S. Pat. No. 3,641,433 to R. W. Mifflin et al, U.S. Pat. No. 5,099,495 to N. Mikoshiba et al, and a technical bulletin titled "Spread Spectrum System" by R. C. Dixon of 1977.

However, these known wireless transmission systems are mostly of the type that a plurality of terminal units between which data signals, voice signals or the like are transmitted and received are respectively provided with both of transmission and receiving circuits, and every one of these circuits comprises a local oscillator, so that there has arisen a problem that, specifically when a local oscillator of a high local oscillation frequency is employed, the system has to be made expensive, and the transmission and receiving circuits provided to the respective terminal units have to be made high in manufacturing costs.

SUMMARY OF THE INVENTION

A object of the present invention is, therefore, to provide a wireless transmission system in which the transmission and receiving circuits in the terminal units can be maintained inexpensive even when the circuits providing a high local oscillation frequency are employed.

Another object of the present invention is to provide a wireless transmission system capable of enhancing the security by subjecting a reference signal of the local oscillation frequency to a scramble or a modulation.

Still another object of the present invention is to provide a wireless transmission system which allows administration of transmitted and received signals to be easier by means of an allocation of a plurality of scrambling or modulation systems respectively to every terminal unit or every group of the terminal units.

A further object of the present invention is to provide a wireless transmission system which less suffers any multipath distortion even in the case where the data transmitting velocity is high.

Yet another object of the present invention is to provide a wireless transmission system which is capable of being improved in the resistance to multipath problem.

Other objects and advantages of the present invention shall become clear as following description of the invention advances as detailed with reference to preferred embodiments of the invention shown in accompanying drawings.

While the present invention is to be explained in the followings with reference to the embodiments shown, it will be appreciated that the intention is not to limit the invention only to these embodiment shown but rather to include all alterations, modifications and equivalent arrangements possible within the scope of appended claims.

DETAILED DESCRIPTION OF THE PREFERRED EMBODIMENTS

Figure 1:
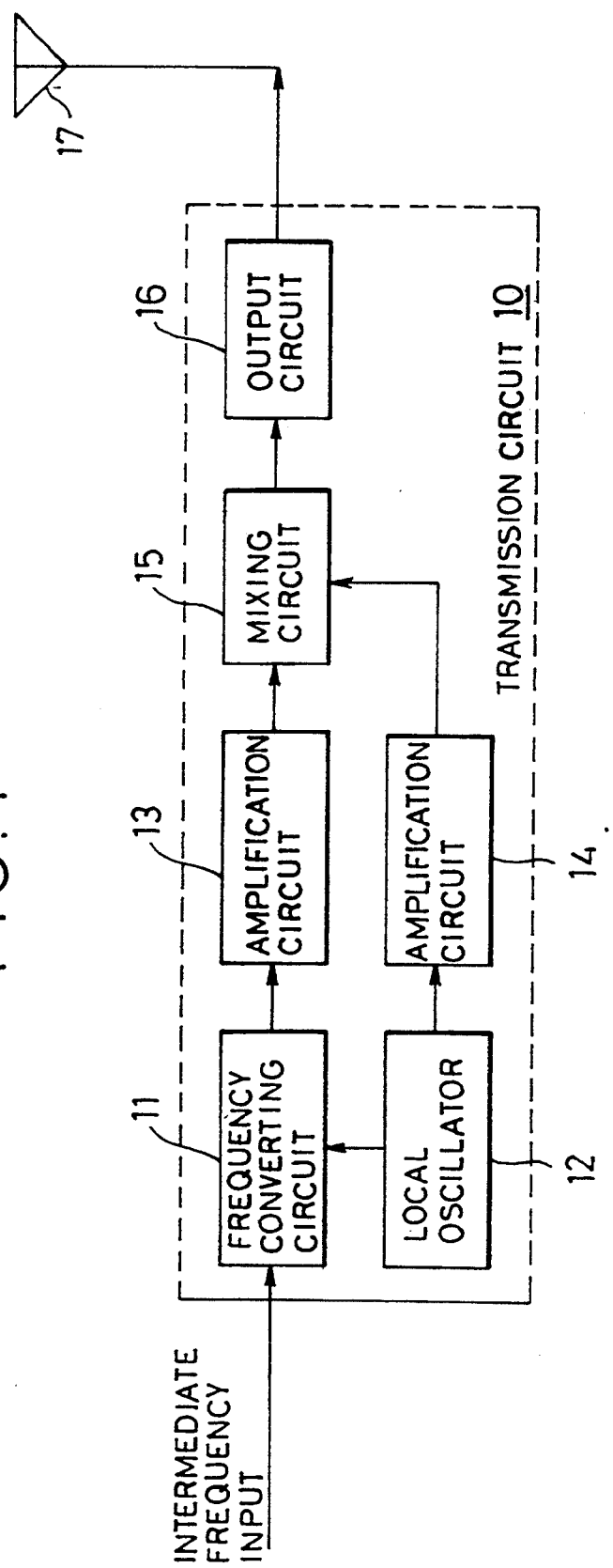
FIG. 1 shows in a block diagram a transmission circuit employed in an embodiment of the wireless transmission system according to the present invention.

Referring to FIG. 1, there is shown a transmission circuit 10 of a specific one of a plurality of terminal units in an embodiment of the wireless transmission system according to the present invention. In this transmission circuit 10, an intermediate frequency signal is provided to a frequency converting circuit 11, where the input is mixed with a local oscillation signal from a local oscillator 12 to be converted into a transmitting frequency signal, and this signal is amplified at an amplification circuit 13. A reference signal of the local oscillation frequency is also provided from the local oscillator 12 to a further amplification circuit 14 to be amplified and is then mixed at a mixing circuit 15 with the amplified transmitting frequency signal, and the thus mixed signals are transmitted simultaneously through an output circuit 16 and out of an antenna 17.

Figure 2:
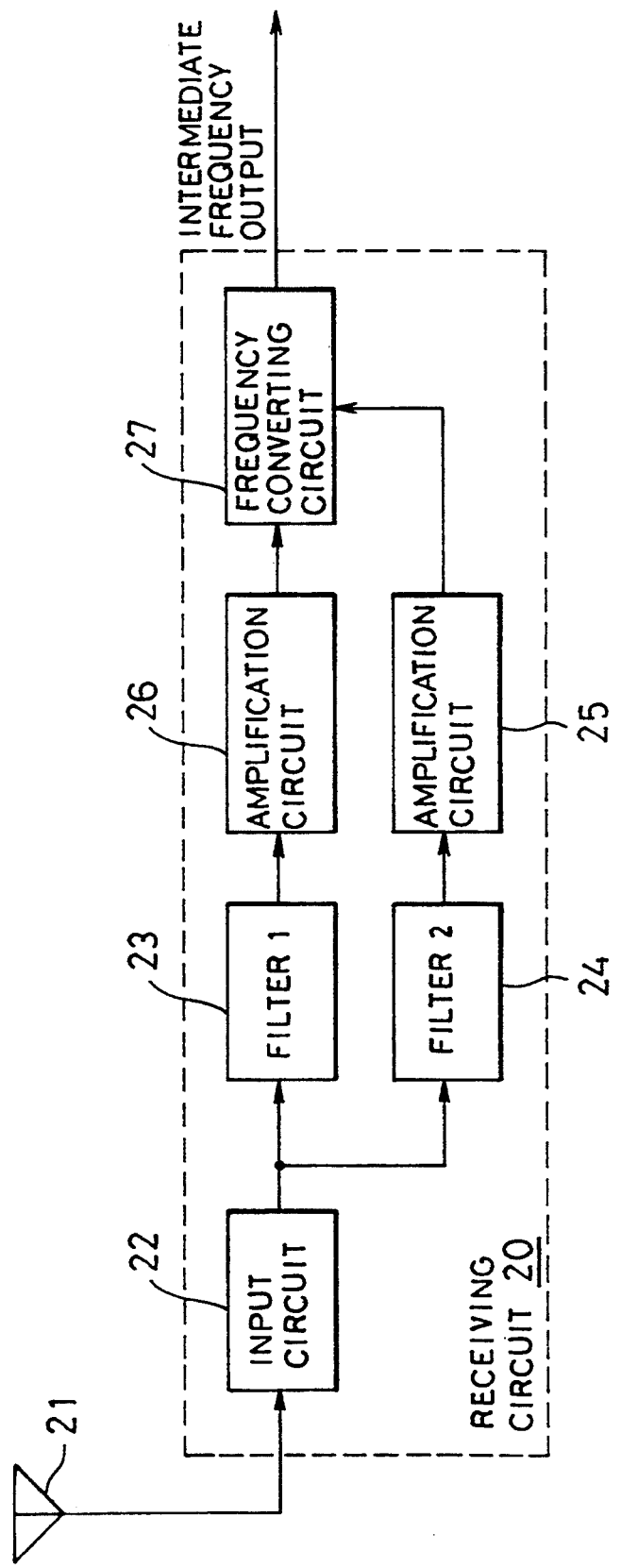
FIG. 2 shows also is a block diagram a receiving circuit employed in the embodiment in FIG. 1.

In a receiving circuit 20 as shown in FIG. 2 of one of other terminal units in the system, on the other hand, the mixed signals received are provided through an input circuit 22 to first and second filters 23 and 24 to be separated into the reference signal and a received signal of the receiving signal, the reference signal is amplified at an amplification circuit 25 so that a local oscillation frequency signal is prepared, while the received signal is amplified at a further amplification circuit 26, the local oscillation frequency signal and the received signal are both provided to a frequency converting circuit 27 to be mixed with each other, and an intermediate frequency signal is provided out of this circuit 27.

Figure 3:
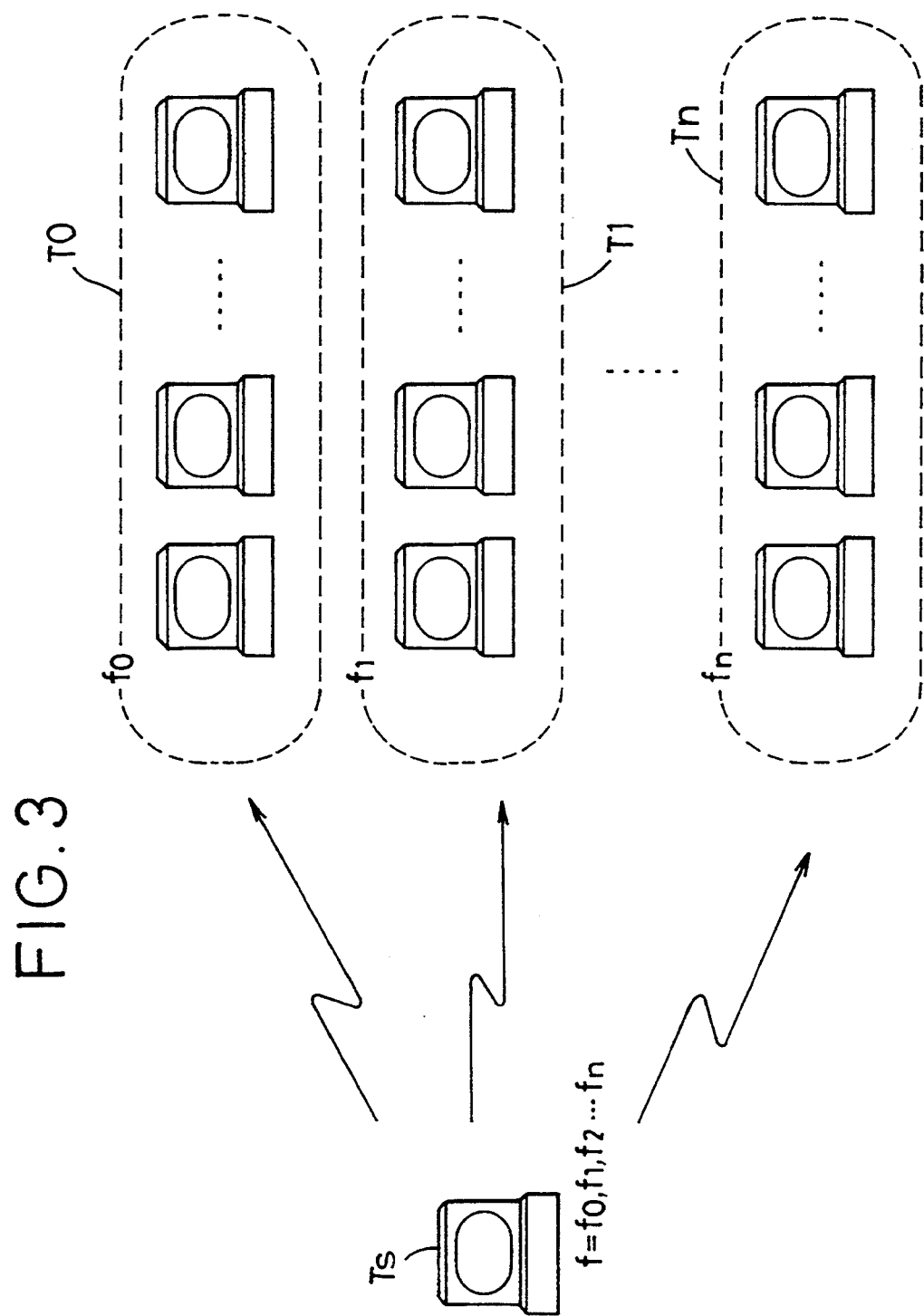
FIG. 3 is an explanatory diagram for the operation of the embodiment in FIG. 1.

Referring more concretely to the system in conjunction with FIG. 3, the transmission circuit 10 of the specific terminal unit Ts provides from the local oscillator 12 a plurality of the reference signals of different frequencies $f_0, f_1, \ldots f_n$, for example, which are mixed respectively with the intermediate frequency signal to be converted into a plurality of the transmitting/receiving frequency signals, and these signals are transmitted from the specific terminal unit Ts towards all other terminal units $T_0, T_1, \ldots T_n$. At the receiving circuit 20 in each of the terminal units $T_0, T_1, \ldots T_n$, the local oscillation frequency signal is prepared with the reference signal from the specific terminal unit Ts, and a conversion of the transmitting frequency signal and intermediate frequency signal is carried out with the local oscillation frequency signal utilized. In this case, the frequencies $F_0, F_1, \ldots f_n$ of the reference signal may be allotted respectively to each of the terminal units or, alternately, to every group of the terminal units as shown in FIG. 3.

Here, it will be readily appreciated that, according to the wireless transmission system of the present invention, the receiving circuit in the respective other terminal units is not required to be provided with any local oscillator, so as to be manufacturable at lower costs.

Figure 4:
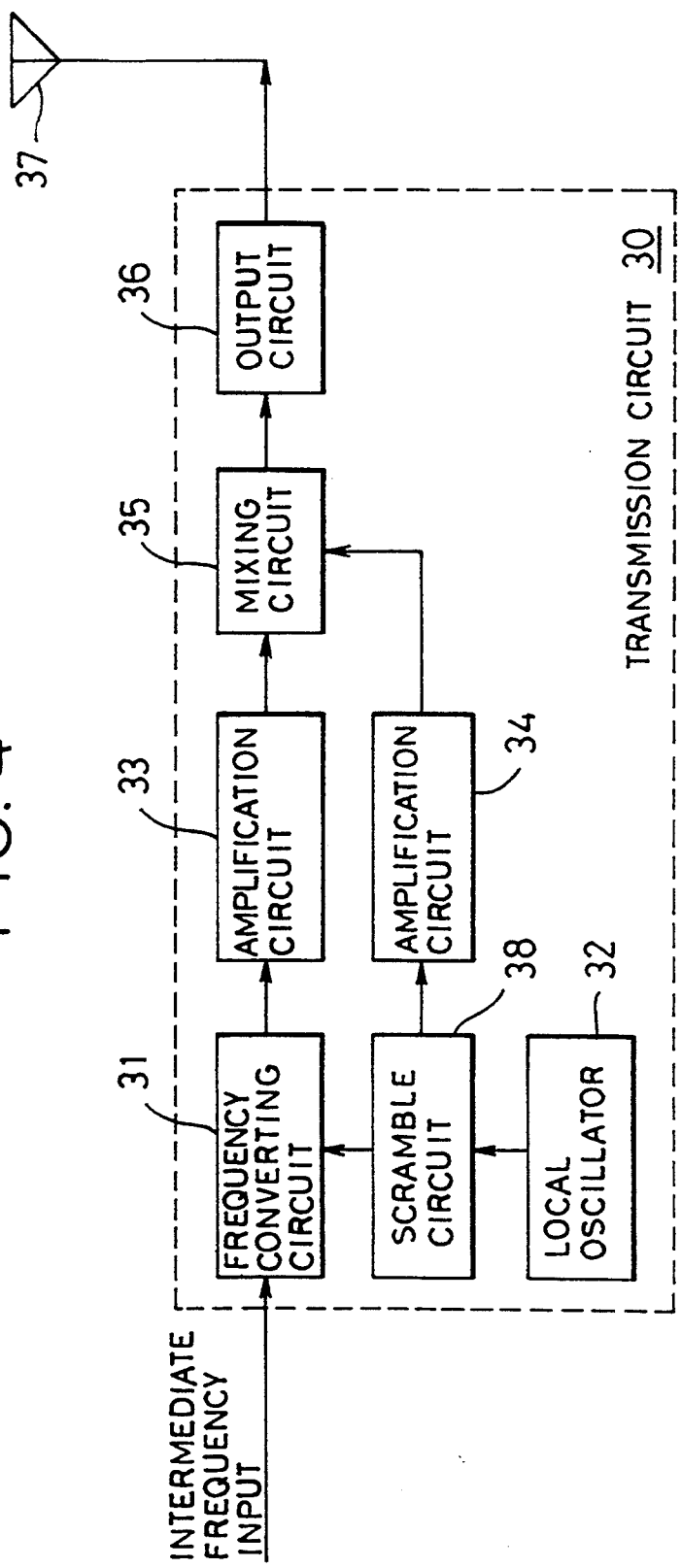
FIG. 4 shows in a block diagram a transmission circuit employed in another embodiment of the wireless transmission system according to the present invention.

In FIG. 4, there is shown a transmission circuit 30 employed in another embodiment of the wireless transmission system according to the present invention, in which circuit 30 a scramble circuit 38 is connected to the local oscillator 32 in contrast to the transmission circuit 10 of FIG. 1, and an output of this scramble circuit 38 is provided to the frequency converting circuit 31 and amplification circuit 34, whereby the local oscillation signal provided from the local oscillator 32 is subjected to a scramble as passed through the scramble circuit 38. The thus scrambled local oscillation signal is provided to the frequency converting circuit 31 to be mixed with the intermediate frequency signal and converted into the transmitting frequency signal, which signal is then amplified at the amplification circuit 33 and mixed at the mixing circuit 35 with the reference signal directly amplified through the amplification circuit 34, and the mixed signals are simultaneously transmitted through the output circuit 36 and out of the antenna 37.

For the receiving circuit used in correspondence to the above transmission circuit 30, substantially the same circuit as the receiving circuit 20 of FIG. 2 is employable, wherein the signals received through the antenna 21 are separated into the scrambled reference signal and received signal through the input circuit 22 and first and second filters 23 and 24, the scrambled reference signal separated is amplified at the amplification circuit 25, the local oscillation frequency signal is thereby prepared and provided to the frequency converting circuit 27 together with the received signal provided as amplified at the amplification circuit 26, and both of these signals provided to the circuit 27 are mixed with each other to be converted into the intermediate frequency signal. In this event, the foregoing scramble may be varied with respect to every terminal unit or every group of the terminal units.

In the embodiment of FIG. 4, all other arrangements and functions are the same as those in the first embodiment shown in FIGS. 1-3, and the same constituent elements as those in the embodiment of FIGS. 1-3 are denoted in FIG. 4 by the same reference numerals but with "20" added thereto.

Figure 5:
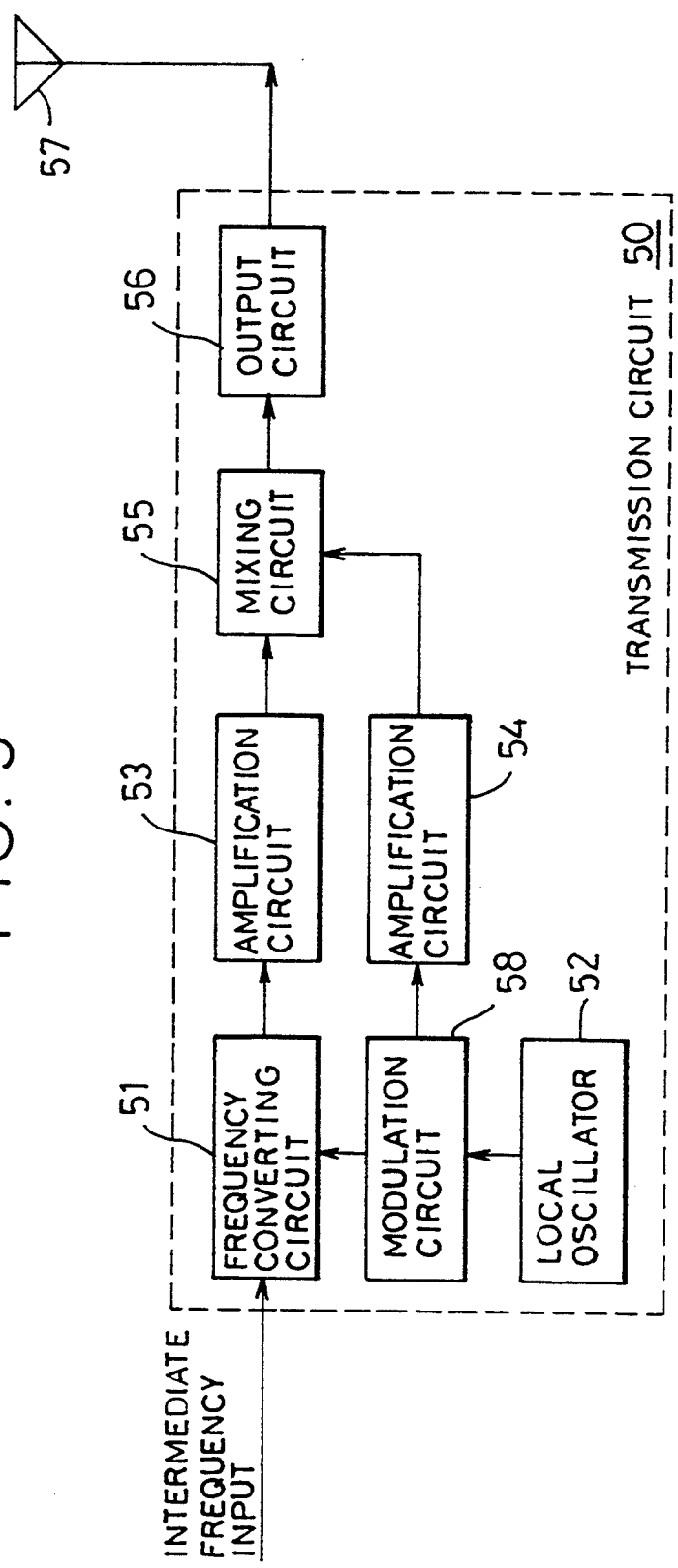
FIG. 5 shows in a block diagram a transmission circuit employed in further another embodiment of the wireless transmission system according to the present invention.

In a transmission circuit 50 employed in further another embodiment of the wireless transmission system according to the present invention, as shown in FIG. 5, a modulation circuit 58 is provided instead of the scramble circuit 38 in the foregoing embodiment of FIG. 4. In this case, the reference signal of a modulated local oscillation frequency is transmitted from the transmission circuit 50 of the specific terminal unit together with the transmitting frequency signal, while in the same receiving circuit as that of FIG. 2 in the respective terminal units, the local oscillation frequency signal is prepared from the modulated reference signal received, the prepared signal is mixed with the receiving signal, and the conversion into the intermediate frequency signal is performed. For the modulation system to be executed at the modulation circuit 58, it may be possible to employ any optional one of AM system, FM system, PM system and so on.

In the circuit 50 of FIG. 5, all other arrangements and functions are the same as those in the embodiment of FIGS. 1-3 and, in FIG. 5, the same constituent elements as those in the embodiment of FIGS. 1-3 are denoted by the same reference numeral but with "40" added.

Figure 6:
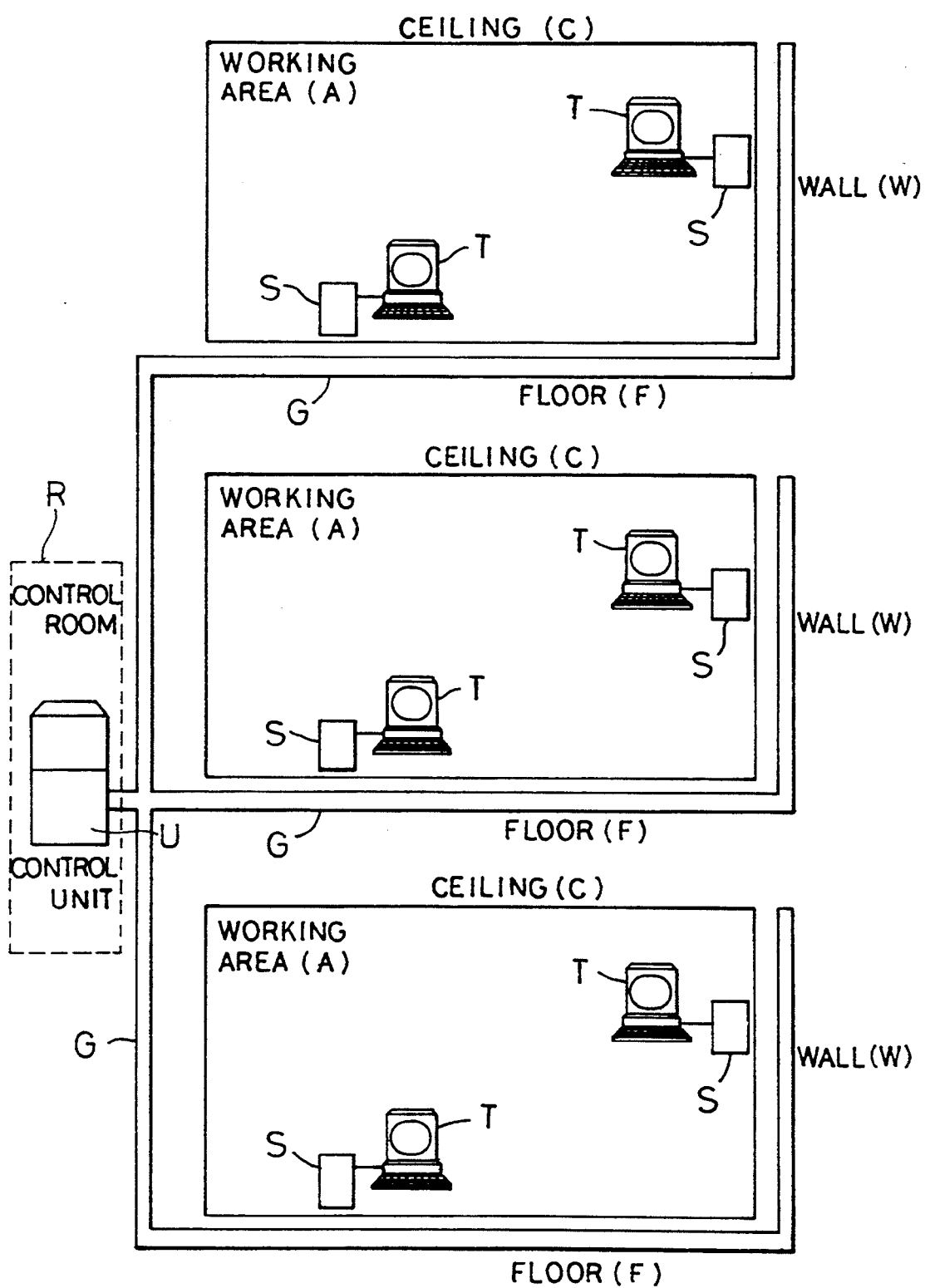
FIG. 6 shows in a schematic explanatory diagram a working aspect of the wireless transmission system according to the present invention.

In FIG. 6, there is shown an aspect in which the wireless transmission system of the present invention is practically worked. In this aspect, the system is arranged in the form of a local area network which executes the wireless transmission with microwaves. In this case, the transmission signal from a control unit U installed at a control room R is transmitted by means of the microwaves through waveguides G which are provided along floors F, walls W or ceilings C of respective working areas A in which a plurality of the terminal units T are dispersedly installed. These terminal units T are respectively provided with a transmission/receiving circuit S, while the waveguides G have apertures or slits opened towards the respective working areas A, so that the microwaves from the apertures of the waveguides G will propagate through space to be received by the transmission/receiving circuit S of the terminal units T. Reversely, the transmission signals from the transmission/receiving circuit S are made to be propagated by means of microwaves through the space wirelessly to reach the apertures of the waveguides G so as to be guided to the control unit U. Further, the control unit U is arranged at another place without the control room R.

In this local area network shown in FIG. 6, microwaves are employed for the transmission signal, and the local oscillator is apt to become expensive. In the present invention, however, the local oscillator may be provided only in the control unit U acting as the specific terminal unit, while the transmission/receiving circuits S of the terminal units T are made to utilize the local oscillation frequency signal transmitted as the reference signal from the local oscillator for the specific terminal unit, and the system of an inexpensive arrangement can be realized. When such scramble circuit or modulation circuit as in the transmission circuit of FIG. 4 or 5 is added to the transmission/receiving circuit S in the foregoing manner, it is possible to render the transmission signal difficult to be intercepted, and the entire system to be high in the security.

Figure 7:
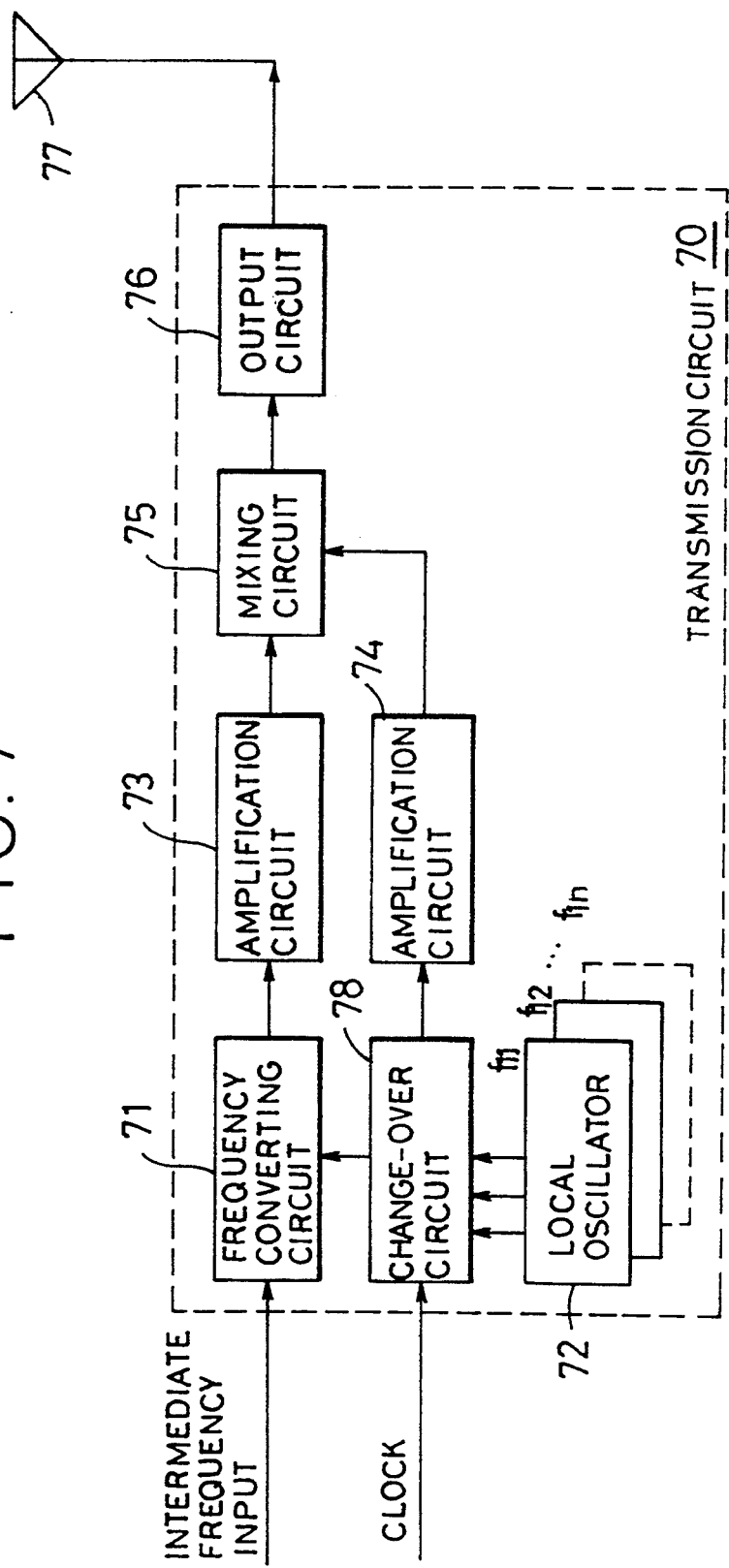
FIG. 7 shows in a block diagram a transmission circuit employed in still another embodiment of the wireless transmission system according to the present invention.

In still another embodiment shown in FIG. 7 of the wireless transmission system according to the present invention, the transmission circuit 70 in the specific terminal unit comprises a plurality of the local oscillators 72 and a change-over circuit 78 connected to the respective local oscillators 72. In this case, the respective local oscillators 72 are oscillating at different local oscillation frequencies as $f_{l1}, f_{l2}, \ldots f_{ln}$, which are input to the change-over circuit 78, so that any one of these local oscillation frequency signals will be provided to the frequency converting circuit 71 in synchronism with a clock signal provided to the change-over circuit 78. The local oscillation frequency signal thus selected at the change-over circuit 78 is amplified at the amplification circuit 74 and is then mixed, at the mixing circuit 75, with the transmitting frequency signal provided thereto as amplified at the amplification circuit 73, so that both of these signals will be concurrently transmitted through the output circuit 76 and out of the antenna 77.

Figure 8:
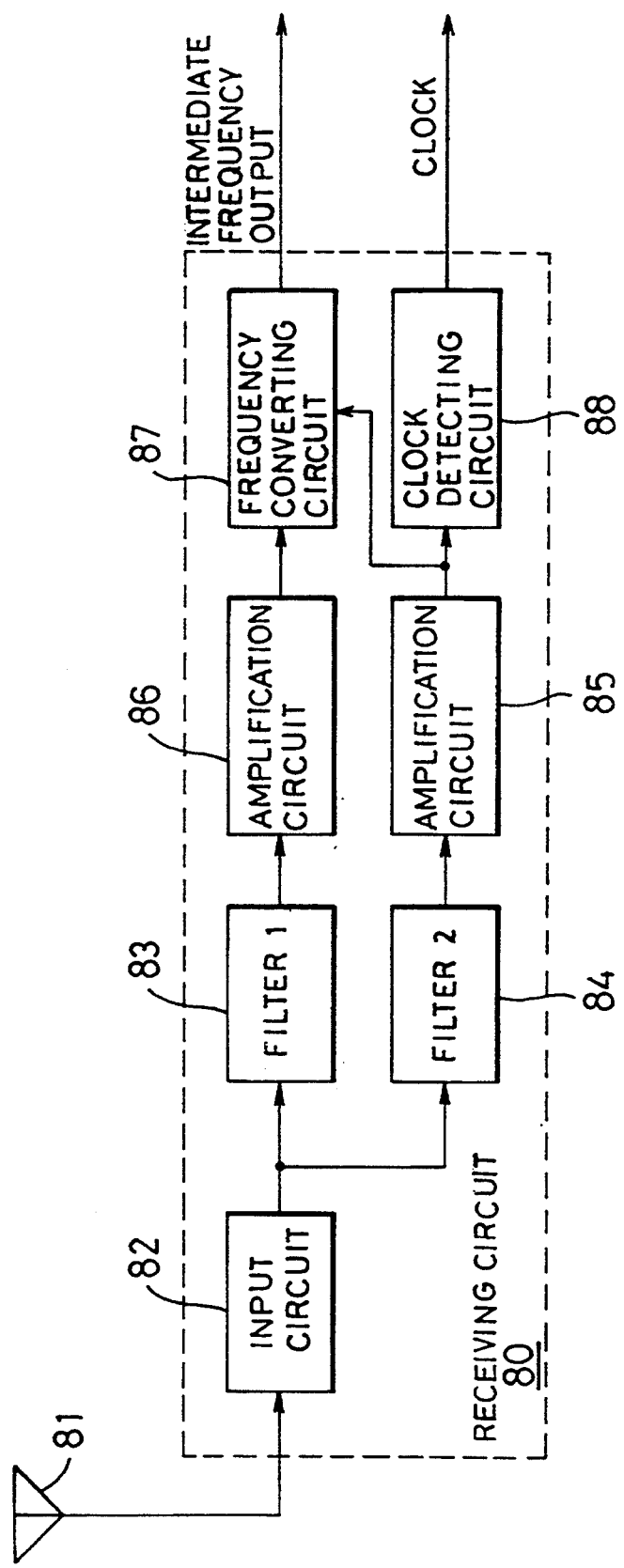
FIG. 8 shows in a block diagram a receiving circuit employed in the embodiment in FIG. 7.

In a receiving circuit 80 as shown in FIG. 8 of the other terminal units, the received signal passed through the first filter 83 is amplified at the amplification circuit 86 and provided to the frequency converting circuit 87, while the reference signal shifted in frequency as passed through the second filter 84 is amplified at the amplification circuit 85 to form the local oscillation frequency signal which is also provided to the frequency converting circuit 87, and both of these signals provided to the frequency converting circuit 87 are mixed to be converted into the intermediate frequency signal which is provided as an output. At the same time, the output of the amplification circuit 85 is also provided to a clock detecting circuit 88, and a clock signal is detected at the circuit 88 from the timing of the frequency shift and is provided as a clock signal, whereby a preparation of the clock signal for a Manchester coding or decoding can be easily attained without any provision of a clock signal oscillator. With such arrangement as disclosed, it is possible to prevent any multipath distortion from occurring even in the case where the data transmission velocity is high.

In the circuits of FIGS. 7 and 8, all other arrangements and functions are the same as those in the embodiment of FIGS. 1-3, and the same constituent elements as those in the embodiment of FIGS. 1-3 are denoted in FIGS. 7 and 8 by the same reference numerals with "60" added thereto.

Figure 9:
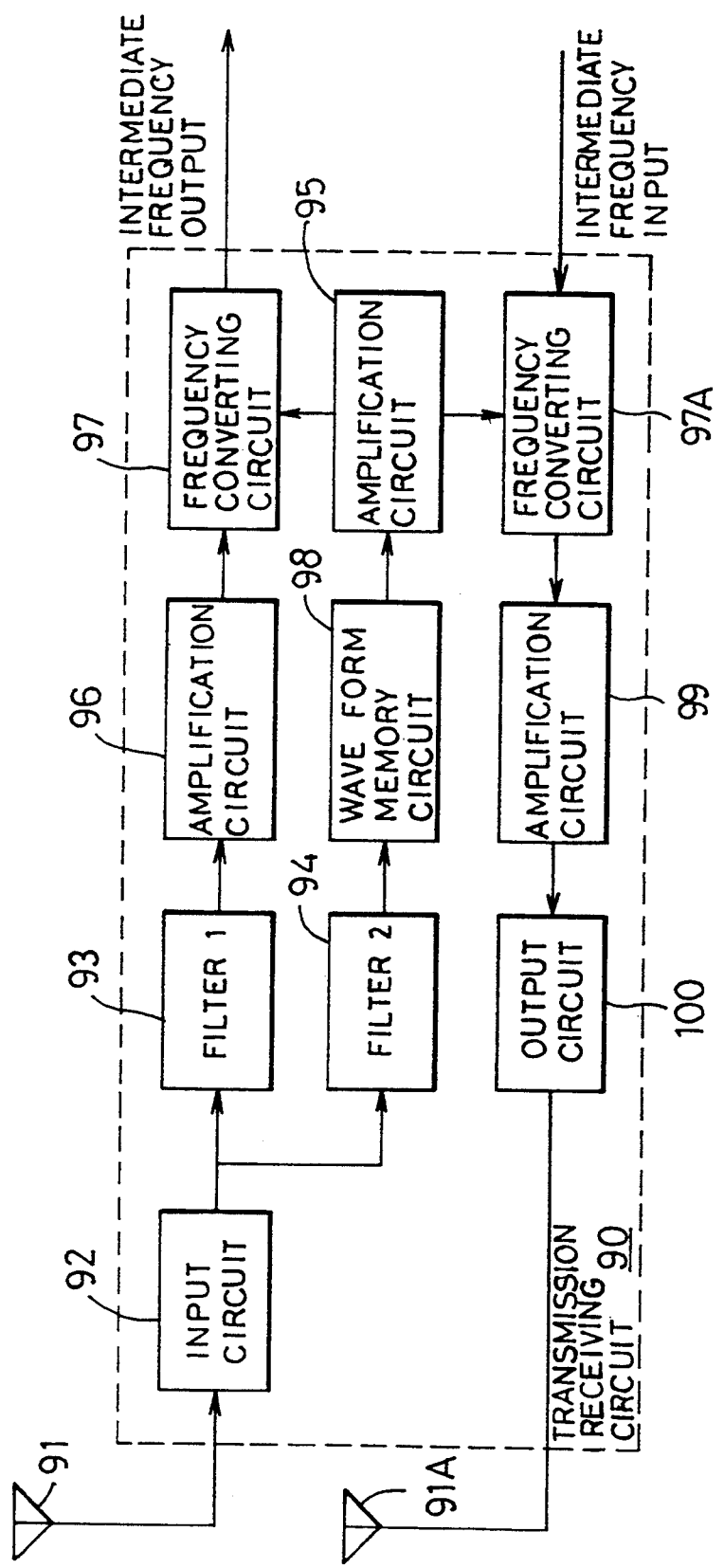
FIG. 9 is a block diagram a transmission/receiving circuit in further other embodiment of the wireless transmission system according to the present invention.

In FIG. 9, there is shown a transmission/receiving circuit in still another embodiment of the wireless transmission system according to the present invention, which circuit is to be provided in the other terminal units which receive the signal transmitted from the specific terminal unit. In this circuit, the input signal from a receiving antenna 91 is provided through the input circuit 92 to the first filter 93, the received signal passed through that filter is amplified at the amplification circuit 96 and provided as an input to the frequency converting circuit 97, while the reference signal passed through the second filter 94 is once stored in a wave-form memory circuit 98 so that, in an event where the reference signal from the specific terminal unit is absent, the reference signal wave-form is output from the wave-form memory circuit 98 to the amplification circuit 95 where the local oscillation frequency signal is thereby prepared, this local oscillation frequency signal is provided into the frequency converting circuit 97, in which both of the signals are mixed and converted into the intermediate frequency signal as an output.

The transmission/receiving circuit 90 of this embodiment further comprises a further frequency converting circuit 97A to which the local oscillation frequency signal from the amplification circuit 95 and the intermediate frequency signal are provided, so that transmitting frequency signal will be transmitted, through the amplification circuit 99, an output circuit 100 and a transmission antenna 91A.

According to the above described embodiment, the local oscillation frequency signal can be stably provided even in the case when the other terminal units cannot receive the reference signal of a local oscillation frequency signal due to a fading or the like caused by multipath transmission, and the system can be effectively improved in the resistance to multipath distortion, as will be readily appreciated.

What is claimed is:

1. A wireless transmission/reception system including a plurality of terminal units, a first of said terminal units including a transmitting/receiving circuit for transmitting a transmitted frequency signal resulting from mixing of an intermediate frequency signal with a local oscillation signal having a local oscillation frequency and for transmitting a reference signal at the local oscillation frequency, the other terminal units each including a transmitting/receiving circuit for receiving the transmitted frequency signal and the reference signal, for detecting the reference signal, and for generating from the detected reference signal the local oscillation frequency signal for frequency conversion of the transmitted frequency signal into the intermediate frequency signal, wherein a plurality of different local oscillation frequencies are generated in said first terminal unit, and one of the local oscillation frequencies is selected as the reference signal and for mixing with the intermediate frequency signal to produce the transmitted frequency signal in synchronism with a clock signal input to said first terminal unit for transmission of the transmitted frequency signal.

2. A wireless transmission/reception system including a plurality of terminal units a first of said terminal units including a transmitting/receiving circuit for transmitting a transmitted frequency signal resulting from mixing of an intermediate frequency signal with a local oscillation signal having a local oscillation frequency and for transmitting a reference signal at the local oscillation frequency, the other terminal units each including a transmitting/receiving circuit for receiving the transmitted frequency signal and the reference signal, for detecting the reference signal, and for generating from the detected reference signal the local oscillation frequency signal for frequency conversion of the transmitted frequency signal into the intermediate frequency signal, wherein each of said transmitting/receiving circuits of said other terminal units comprises means for storing the local oscillation frequency signal generated from the detected reference signal and providing the stored local oscillation frequency signal for the frequency conversion when the reference signal is not received from said first terminal unit.

* * * * *